United States Patent [19]

Ohsaki

[11] Patent Number: 5,638,856
[45] Date of Patent: Jun. 17, 1997

[54] STOP VALVE STRUCTURE

[75] Inventor: Hiroshi Ohsaki, Sashima-gun, Japan

[73] Assignee: Kyosan Denki, Co., Ltd., Tokyo, Japan

[21] Appl. No.: 453,799

[22] Filed: May 30, 1995

[30]  Foreign Application Priority Data

Dec. 2, 1994  [JP]  Japan ................... 6-329403

[51] Int. Cl.⁶ ............................. F16K 31/22; F16K 17/36
[52] U.S. Cl. ................................ 139/202; 137/43
[58] Field of Search ........................ 137/43, 202

[56]  References Cited

U.S. PATENT DOCUMENTS

| | | | |
|---|---|---|---|
| 4,982,757 | 1/1991 | Ohasi | 137/202 |
| 4,991,615 | 2/1991 | Szlaga | 137/202 X |
| 5,044,389 | 9/1991 | Gimby | 137/43 X |
| 5,439,023 | 8/1995 | Horikawa | 137/202 |

FOREIGN PATENT DOCUMENTS

| | | |
|---|---|---|
| 1-114422 | 8/1989 | Japan . |
| 2-112658 | 4/1990 | Japan . |
| 4-74124 | 6/1992 | Japan . |
| 5-1547 | 1/1993 | Japan . |

*Primary Examiner*—John Rivell
*Attorney, Agent, or Firm*—Oliff & Berridge

[57]  ABSTRACT

A stop valve for use in, for example, a fuel tank bleeding system, has a casing with a valve opening defined in a top portion thereof, a bleeding passage provided downstream of the valve opening, a float provided in a casing for vertical movements, and an elastically deformable valve element disposed on top of the float for closing the valve opening when raised together with the float. The valve element includes a hole extending therethrough. An abutment member is provided in the valve opening for, when the valve element is lifted, abutting a portion of the valve element that surrounds the hole. Optionally, the lower end of the abutment member has a recess. The abutment member may be provided with a member for reducing deformation of the valve element caused by abutment to the abutment member. A fuel splash guard may be provided in the bleeding passage.

24 Claims, 13 Drawing Sheets

PRIOR ART

PRIOR ART

STOP VALVE STRUCTURE

BACKGROUND OF THE INVENTION

1. Field of the Invention

The present invention relates to a stop valve employed in a bleeding system of a fuel tank for an internal combustion engine of a motor vehicle and, more particularly, to an improvement in a stop valve having a float.

2. Description of the Related Art

Most of the fuel tanks of internal combustion engine vehicles are provided with a bleeding system that communicates the tanks with the atmosphere. Such a bleeding system is normally provided with a canister for preventing fuel vapor from escaping to the atmosphere.

If the bleeding system is exposed to the outside when the vehicle (or the fuel tank) tilts beyond a certain degree or flips over, fuel from the tank will likely flow through the system to the outside. Therefore, the bleeding system is provided with a stop valve for closing the system if the vehicle is significantly tilted or flipped over.

A typical stop valve employed in the fuel vapor bleeding system has a float that floats in liquid fuel to close the system when the fuel surface rises to a predetermined level.

A known stop valve (Japanese Laid-Open Patent Application No. HEI 2-112658) will be described with reference to FIGS. 12 and 13. FIG. 12 is a sectional view of such a stop valve, and FIG. 13 is an exploded perspective view of a float unit shown in FIG. 12.

The stop valve comprises a casing 1 and a float 2 provided therein. A spring 4 is disposed between the float 2 and a barrier plate 3 so as to urge the float 2 toward a valve opening 5. The casing 1 defines a bleeding port 6 with the valve opening 5 that serves as an inlet to the bleeding port 6. A valve element 7 for closing the valve opening 5 is coupled to a mounting member 8 that is connected to the float 2. The valve element 7 defines a hole 9 extending therethrough, which will be closed by the float 2.

The stop valve operates as follows. The bleeding port 6 is in communication with the atmosphere via a canister (not shown). The canister captures or absorbs fuel vapor from the bleeding port 6, thus preventing the fuel vapor from escaping to the atmosphere.

If the fuel tank is tilted or inclined beyond a certain degree and fuel enters the casing 1, the float 2 rises so that the valve element 7 closes the valve opening 5 and, simultaneously, the float 2 closes the hole 9 of the valve element 7. Thus, fuel will not leak to the outside via the bleeding system.

When the fuel tank resumes a normal posture and the fuel flows out from the casing 1 toward the tank, the float 2 will descend by gravity, separating from the hole portion 9 of the valve element 7. Even if the tank pressure has become higher than the atmospheric pressure by that time, the attachment of the float 2 to the hole portion 9 will be readily released because the area of attachment between the float 2 and the hole portion 9 is small relative to the weight of the float 2. As a result, the pressure difference across the valve element 7 is canceled so that the valve element 7 is released from the valve opening 5.

Recent demand for increased bleeding capacity has increased the size of the valve opening 5. Accordingly, the valve element 7 is also increased in diameter. Such increased dimensions or area increases the force that will act on the valve element 7 toward the valve opening portion 5 when the tank pressure becomes higher than the atmospheric pressure with the valve opening 5 closed by the valve element 7. The increased closing force will impede separation of the valve element 7 from the valve opening portion 5. Therefore, the enlarged valve element 7 may remain stuck to the valve opening portion 5 even after the vehicle resumes a horizontal posture.

To avoid this undesired event, the stop valve shown in FIGS. 12 and 13 employs a two-step shutting construction as described above. In this construction, the float 2 closes the hole 9 formed in a central portion of the valve element 7, and a peripheral portion of the valve element 7 abuts a periphery of the valve opening 5. Thus, the valve opening 5 is closed by the valve element 7, and the hole 9 of the valve element 7 is closed by the float 2.

Even if the tank pressure is significantly higher than the atmospheric pressure, the float 2 will be readily separated from the hole portion 9 by gravity. Then, vapor flows through the hole 9 into the bleeding port 6 to cancel the pressure difference across the valve element 7. Thus, the valve element 7 will readily separate from the valve opening portion 5.

The valve element 7 is normally formed of an elastically deformable material, such as rubber, to enhance sealing of the bleeding system. However, when such an elastically deformable valve element 7 deforms, a central portion surrounding the hole 9 may also deflect, resulting in insufficient closure of the hole 9 by the float 2.

In the construction shown in FIGS. 12 and 13, the valve element 7 is mounted on the mounting member 8, which is connected to the float 2. The valve element 7 is thus supported so as to reduce deflection of the central portion surrounding the hole 9.

However, the above-described known stop valve has the following drawbacks.

Mounting the valve element 7 to the mounting member 8 does not sufficiently prevent deformation of the valve element 7. Thus, a central portion of the valve element 7 is likely to deform and impede sealing of the hole 9.

Employment of the mounting member 8 for reducing deformation of the valve element 7 adds to the number of component parts, thus increasing production costs and the number of assembly steps required.

Furthermore, if the diameter of the valve opening 5 is increased, splashing fuel produced during refueling or the like will more likely reach the canister via the bleeding port 6. To prevent such an event, the length of the bleeding system must be increased. Such a dimensional increase will reduce the freedom of designing or laying out the fuel tank system.

SUMMARY OF THE INVENTION

Accordingly, an object of the present invention is to provide a stop valve that overcomes the above-described drawbacks of the known stop valves and, more specifically, enhances the sealing performance thereof and prevents splashing fuel from reaching the canister.

According to a first aspect of the present invention, there is provided a stop valve structure comprising: a casing having a valve opening defined in an upper portion thereof; a bleeding passage provided downstream of the valve opening; a float provided inside the casing for generally reciprocating movements within the casing; a valve element made of an elastically deformable material and provided on top of the float for closing the valve opening when lifted together with the float, the valve element defining a hole extending therethrough; and an abutment member provided inside the valve opening for, when the valve element is lifted, abutting a portion of the valve element that surrounds the hole.

According to the present invention, a lower end of the abutment member may have a recess. Further, the stop valve structure may comprise a device for reducing deformation of the valve element, the device substantially surrounding the abutment member.

Further, according to the invention, the stop valve structure may comprise a fuel splash guard provided inside the bleeding passage for blocking splashing fuel.

In the stop valve of the present invention, the closure, by the abutment member, of the hole formed in a central portion of the valve element can be readily released or canceled even if the pressure inside the fuel tank has increased. Thus, the present invention substantially eliminates the possibility that the valve element will remain stuck to the valve opening portion.

According to a second aspect of the present invention, there is provided a stop valve comprising a casing having a valve opening, a floating body reciprocable within the casing, the floating body being adapted to close the valve opening, and structure for equalizing a pressure differential produced across the floating body when the valve opening is closed.

BRIEF DESCRIPTION OF THE DRAWINGS

Further objects, features and advantages of the present invention will become apparent from the following description of preferred embodiments with reference to the attached drawings in which like reference number designate like parts, wherein.

DETAILED DESCRIPTION OF PREFERRED EMBODIMENTS

A first embodiment of the present invention will be described with reference to FIGS. 1 through 5.

Figure 1:
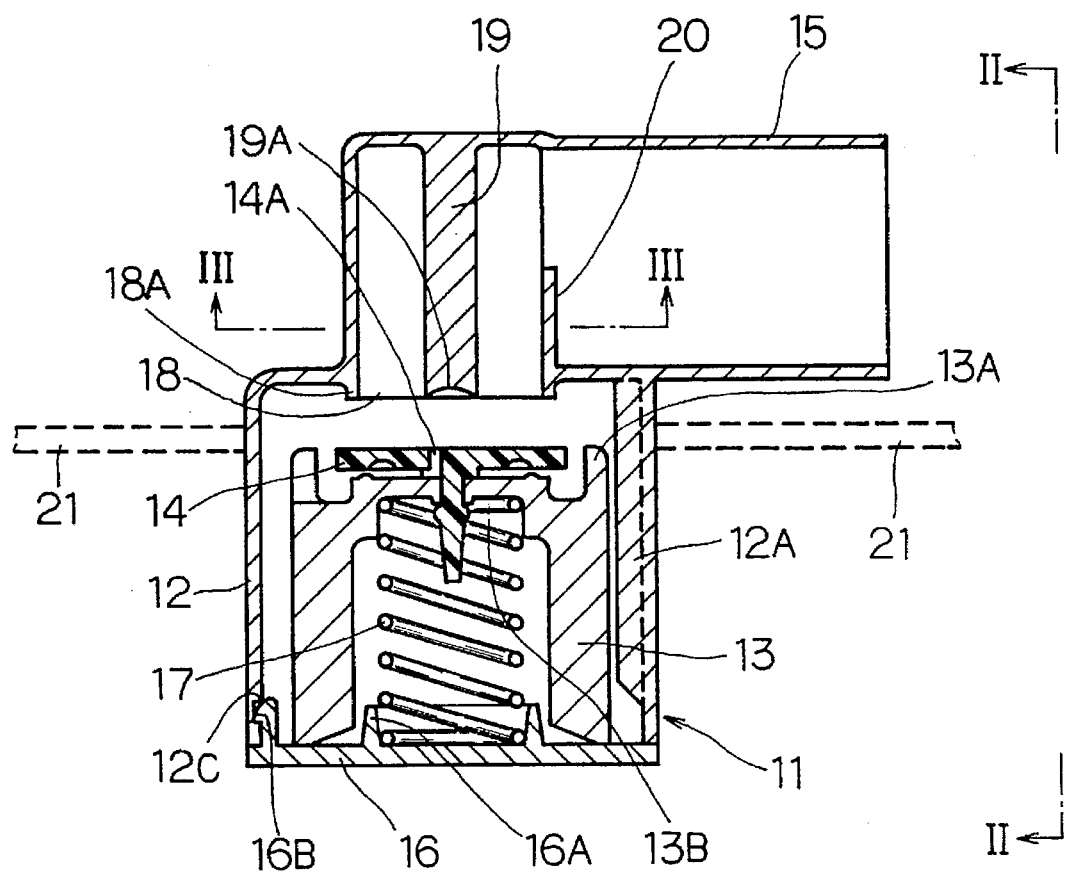
FIG. 1 is a sectional view of a first embodiment of the stop valve of the present invention.
Figure 2:
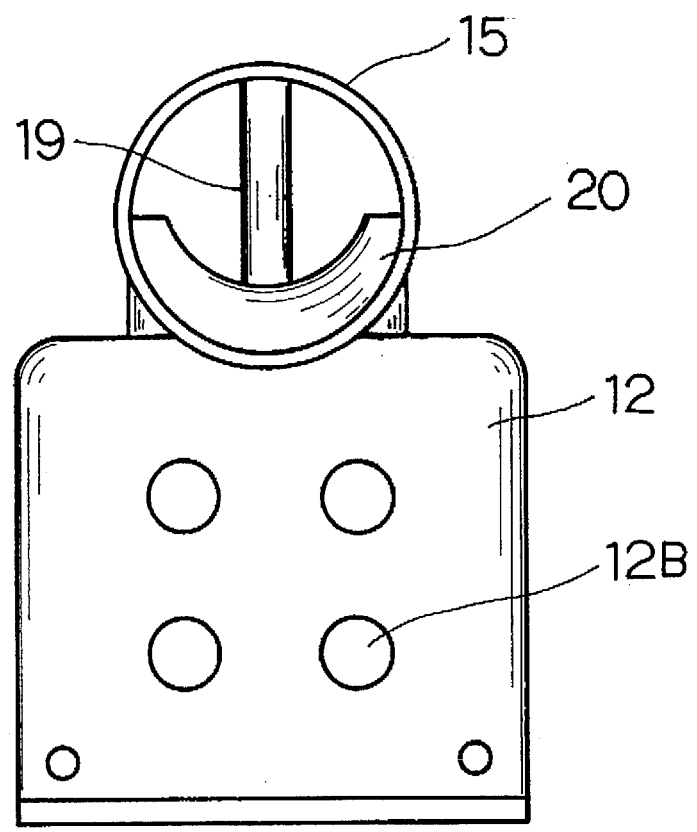
FIG. 2 is an elevation of the embodiment viewed in the direction of arrows II of FIG. 1.
Figure 3:
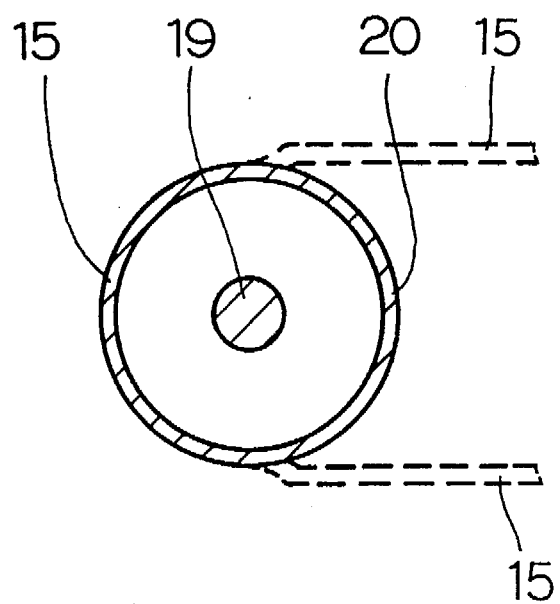
FIG. 3 is a sectional view taken on plane III—III of FIG. 1.

Referring to FIGS. 1–3, a stop valve according to this embodiment has a casing 12, a float 13 disposed inside the casing so as to be movable vertically, that is, along the axis of the casing 12, a valve element 14 connected to the top of the float 13, and a bleeding passage 15 connected to a top portion of the casing 12. The float 13 and the valve element 14, being substantially fixedly attached to one another to form an integral body, can be considered to be a floating body.

The casing 12 has a tubular shape. Reinforcing ribs 12A are formed on the internal surface of the circumferential wall of the casing 12. The circumferential wall defines a plurality of holes 12B for introducing liquid and vapor fuel into the casing 12, as shown in FIG. 2.

A bottom plate 16 is fixed to the lower edge of the casing 12. The bottom plate 16 defines at least one hole (not shown) for introducing fuel. A central portion of the bottom plate 16 has on its internal surface a plurality of spring accommodating protrusions 16A that are arranged in a circular pattern. A peripheral portion of the bottom plate 16 has a plurality of engagement lugs 16B each having a hooked end. The casing 12 has corresponding engagement recesses 12C formed adjacent the bottom edge thereof. The hooked ends of the engagement lugs 16B are engaged with the engagement recesses 12C, thus fastening the bottom plate 16 to the casing 12.

The float 13 disposed in the casing 12 generally has a shape of an inverted cup. The valve element 14 is disposed above the float 13. The valve element 14 is formed of an elastically deformable material such as rubber. A hole 14A is formed in the valve element 14, generally adjacent a center thereof. The hole 14A extends vertically through the valve element 14. The float 13 has upstanding arcuate splash guard walls 13A extending from the circumferential wall of the float 13. The splash guard walls 13A substantially define the outer periphery of the top surface of the float 13.

Inside the float 13, a spring receiving recess 13B is formed in a top ceiling portion thereof. An elastic member 17, for example, a coil spring, is disposed between the recess 13B and the spring accommodating protrusions 16A formed on the bottom plate 16. The elastic member 17 urges the float 13 in a direction such that the valve element 14 mounted on the float 13 will reach and close a valve opening 18 (which will be later described). The elastic restoration force of the elastic member 17 thus disposed is smaller than the total gravity of the float 13 and the valve element 14. The elastic restoration force is predetermined so that when fuel flows into the casing 12, the float 13 and the valve element 14 will be together lifted to close the valve opening 18.

The valve opening 18 is defined in a central portion at the top of the casing 12, leading to the bleeding passage 15. An abutment member 19 comprises a rod member that extends downward from the wall of the bleeding passage 15, as shown in FIGS. 1 and 3. The lower end of the abutment member 19 is located substantially at the center of the valve opening 18. A projected periphery 18A of the valve opening 18 projects slightly downward generally from the inner surface of the top shoulder portion of the casing 12. The projected periphery 18A ensures proper seating thereto of the entire peripheral portion of the valve element 14 and tight sealing of the valve opening 18.

The lower end of the abutment member 19 has a generally concave surface, thus forming a recess 19A. The lower edge of the abutment member 19 substantially coincides with the plane defined by the lower end of the projected periphery of the valve opening 18. When the valve element 14 closes the valve opening 18 and abuts the abutment member 19, the hole 14A of the valve element 14 communicates with the recess 19A. The recess 19A facilitates releasing a central portion of the valve element 14 from the lower end of the abutment member 19.

Provided inside the bleeding passage 15 is a splash guard plate 20 that generally covers a lower half of a cross section of the bleeding passage 15. If such a guard plate is not provided, splashing fuel will be transported mainly through a lower half portion of the bleeding passage 15. Therefore, coverage of a lower half section by the splash guard plate 20 is sufficient to block splashing fuel and prevent leakage. Thus, the shape of the splash guard plate 20 may be of a semi-circle or a crescent.

The thus-constructed stop valve 11 is mounted to a fuel tank 21.

Operation of the above-described stop valve will be explained with reference to FIGS. 1 through 5.

The float 13 is normally in a lowered position such that the valve element 14 is apart from the valve opening 18, thus leaving the valve opening 18 open, as shown in FIG. 1. The inside of the fuel tank 21 is in communication with the atmosphere via the valve opening 18 and a canister (not shown).

Figure 4:
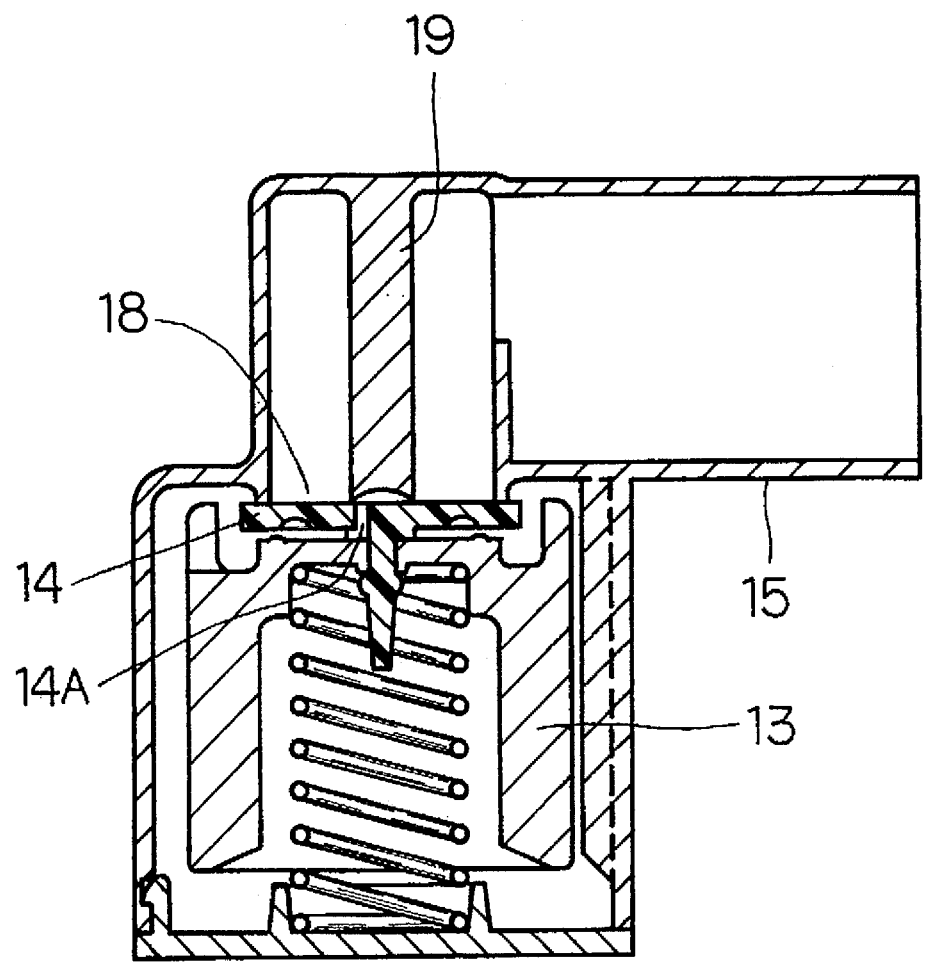
FIG. 4 illustrates the operation of the embodiment, wherein a valve opening is closed by a valve element.
Figure 5:
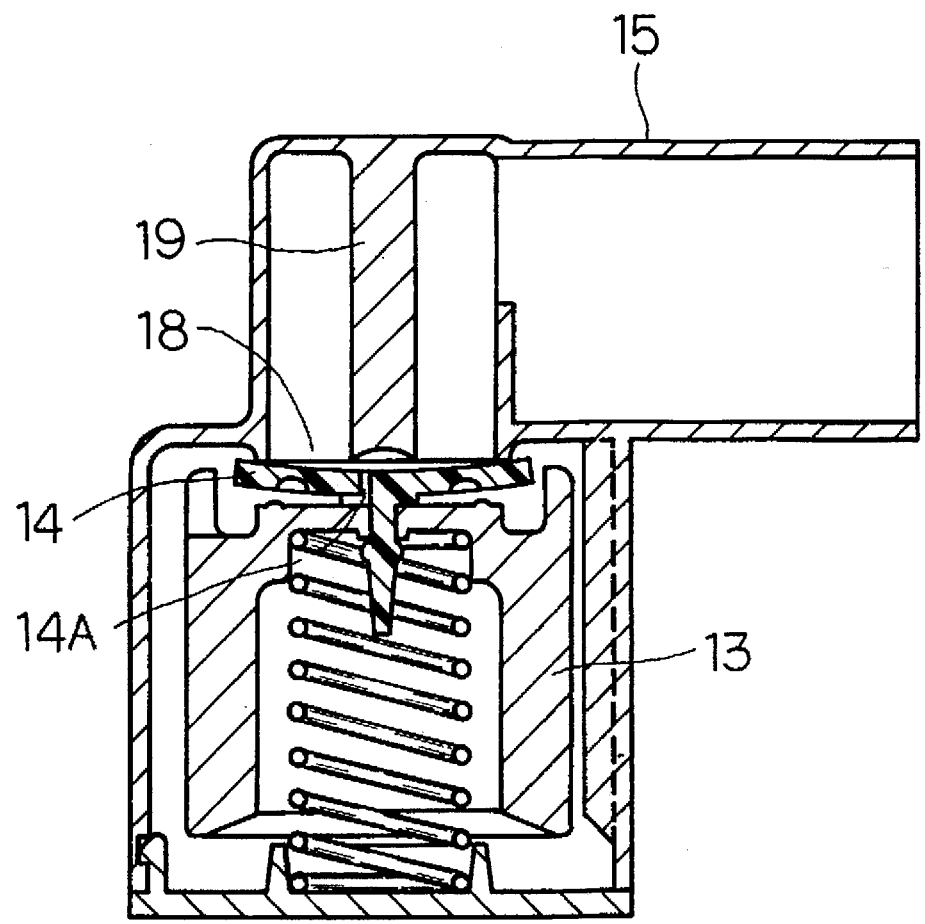
FIG. 5 also illustrates the operation of the embodiment, wherein the valve element is being separated from the valve opening portion.

If the fuel tank 21 or the vehicle is tilted or inclined so that fuel enters the casing 12, the float 13 and the valve element 14 are together lifted so that the valve element closes the valve opening 18, as shown in FIG. 4. In this event, a peripheral portion of the valve element 14 abuts the projected periphery of the valve opening 18, and a central portion thereof abuts the abutment member 19.

Let it assumed that the pressure inside the fuel tank 21 is increased with the valve opening 18 closed by the valve element 14 and the inclination of the fuel tank 21 is then reduced so that fuel flows from the casing 12 back into the fuel tank 21. In such an event, despite the gravity of the float 13 and the valve element 14, the valve element 14 may momentarily remain stuck to the valve opening 18 because of the tank pressure acting on the lower surface of the valve element 14. However, because the recess 19A of the abutment member 19 is exposed to the tank pressure via the hole 14A of the valve element 14 and because the load of the float 13 pulls a central portion of the valve element 14, the central portion of the valve element 14 readily separates from the abutment member 19. Fuel vapor thereby flows into the bleeding passage 15 via the hole 14A to cancel the pressure difference across the valve element 14. As a result, the valve element 14 separates from the periphery of the valve opening 18.

Thus, the valve element 14 will readily and unfailingly re-open the valve opening 18 when the fuel tank 21 returns to a normal posture.

In addition, if splashing fuel reaches the vicinity of the valve opening 18 or enters the bleeding passage 15 via the valve opening 18 during, for example, refueling, splashing fuel is blocked by the splash guard wall 13A and the splash guard plate 20 shown in FIGS. 1 and 2. Thus, these splash guards substantially prevent fuel from reaching the canister and leaking to the outside.

Figure 6:
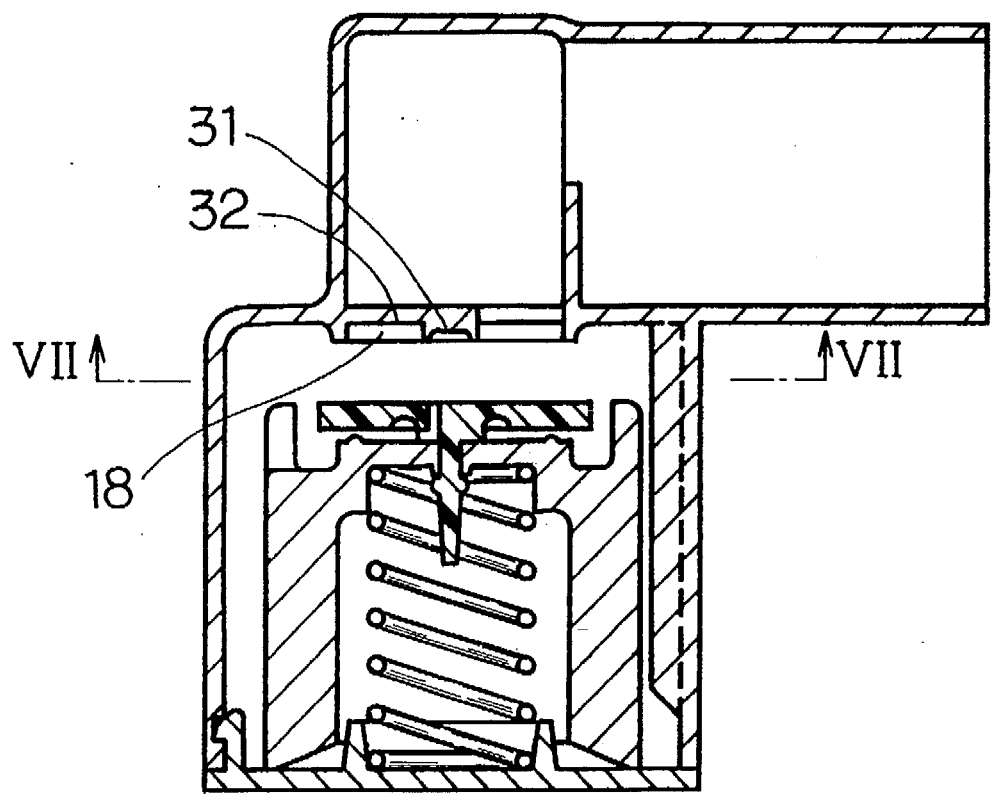
FIG. 6 is a sectional view of a second embodiment of the stop valve of the invention.
Figure 7:
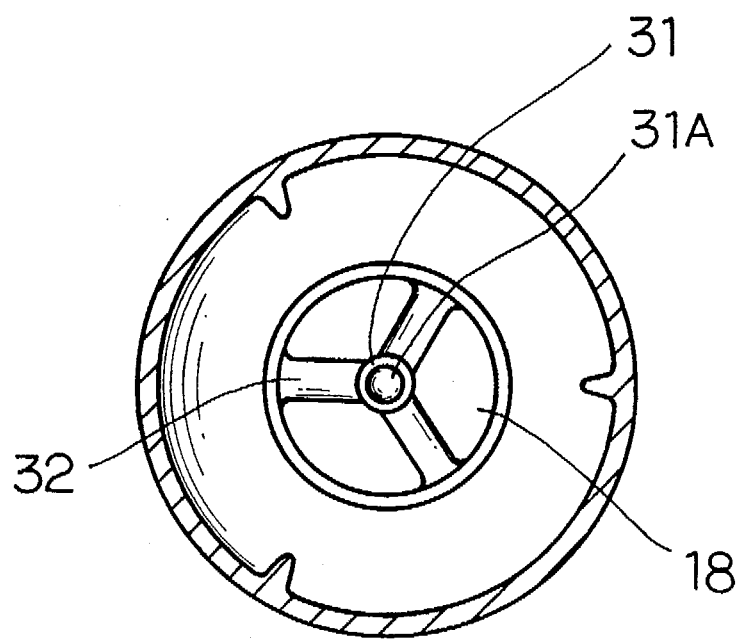
FIG. 7 is a sectional view taken on plane VII—VII of FIG. 6.

A second embodiment of the stop valve of the invention will be described with reference to FIGS. 6 and 7.

This embodiment differs in the construction of the abutment member. As shown in FIGS. 6 and 7, an abutment member 31 comprises an annular member that is supported by a plurality of arms 32 radially extending from the abutment member 31 to the inner peripheral surface of the valve opening 18. The abutment member 31 has a recess 31A defined by a projected edge as in the first embodiment. Other construction and component parts are generally the same as in the first embodiment, and will not be described again.

Figure 8:
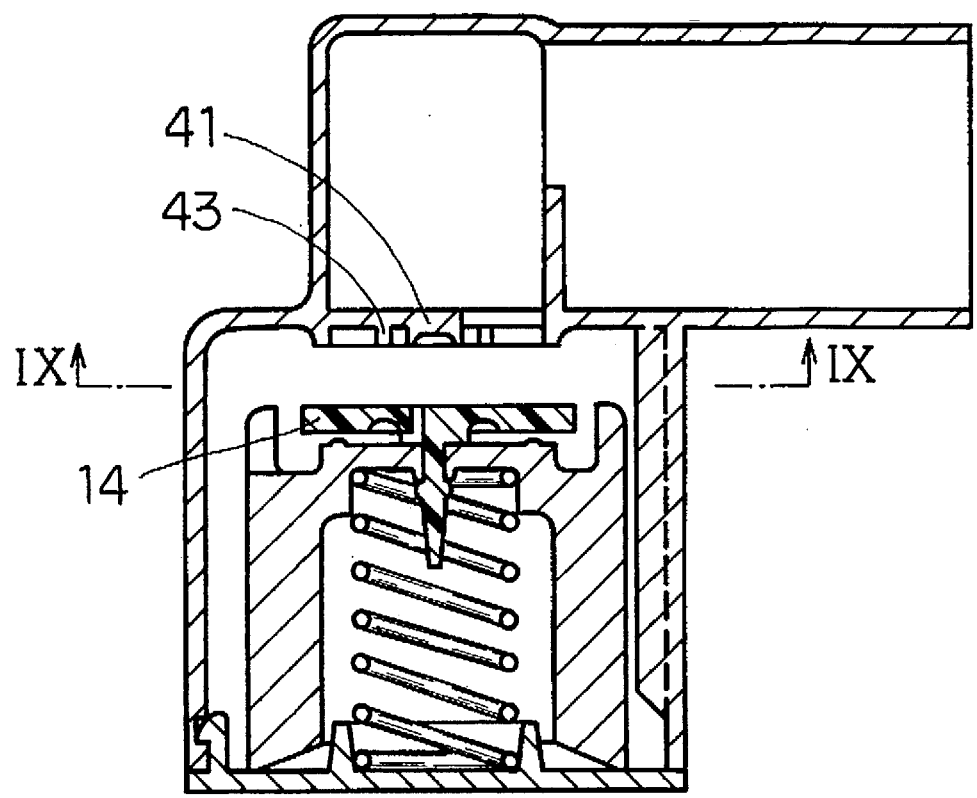
FIG. 8 is a sectional view of still a third embodiment of the stop valve of the invention.
Figure 9:
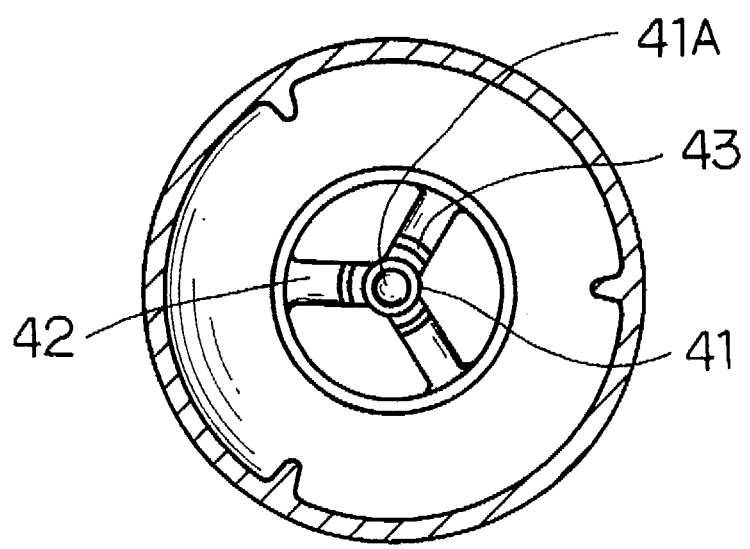
FIG. 9 is a sectional view taken on plane IX—IX of FIG. 8.

A third embodiment will be described with reference to FIGS. 8 and 9. An abutment member 41 is constructed similarly to the abutment member 31 of the second embodiment. However, the abutment member 41 having a recess 41A is surrounded by generally arcuate protrusions 43 protruding downward from arms 42. Preferably, the lower ends of the protrusions coincide with the plane of the projected edge of the abutment member 41 and the projected periphery of the valve opening 18. If such surrounding protrusions are not provided, a central portion of the valve element 14 might deform and bend around the abutment member 41 when the valve element 14 is stuck to the valve opening 18. However, the protrusions 43 will abut and support a central portion of the valve element 14 to reduce deformation of the central portion. Thereby, separation of the valve element 14 from the abutment member 41 is further facilitated.

It should be understood that the means for reducing deformation of the valve element 14 can be constructed in manners other than the arcuate protrusions 43. For example, the deformation reducing means may be provided by forming an annular member surrounding the abutment member 410. Further, the deformation reducing means may be provided by forming generally arcuate protrusions extending from the peripheral surface of the abutment member 19 of the first embodiment, with the lower ends of the protrusions substantially coinciding with the plane defined by the lower end of abutment member 19.

Other construction and component parts of the stop valve according to this embodiment are generally the same as in the first and second embodiments.

Figure 10:
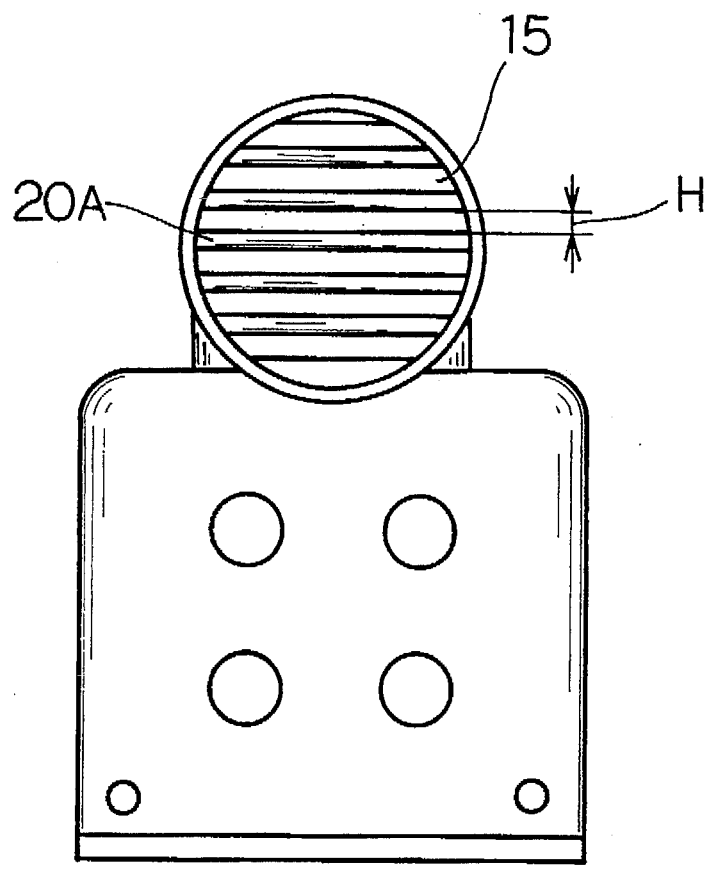
FIG. 10 is an elevation of a stop valve, illustrating a splash guard according a further embodiment.
Figure 11:
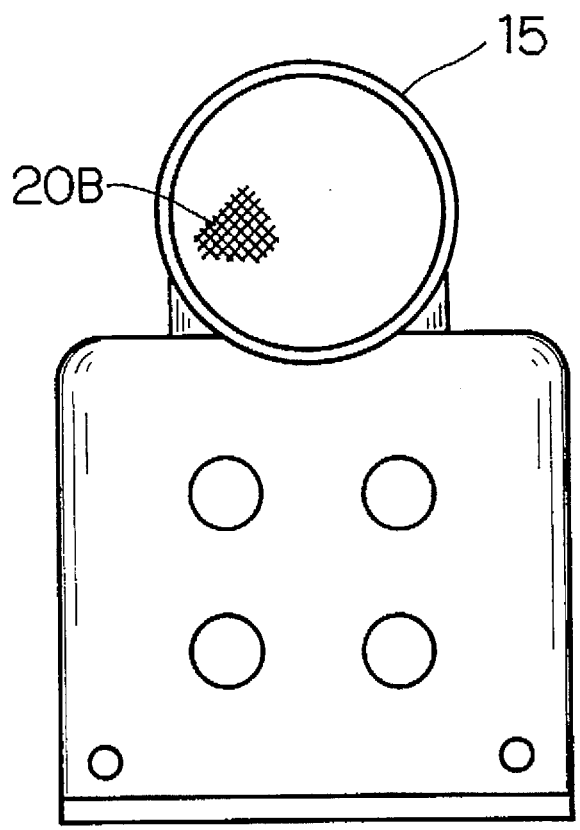
FIG. 11 is an elevation of a stop valve, illustrating another splash guard according to a still further embodiment.
Figure 12:
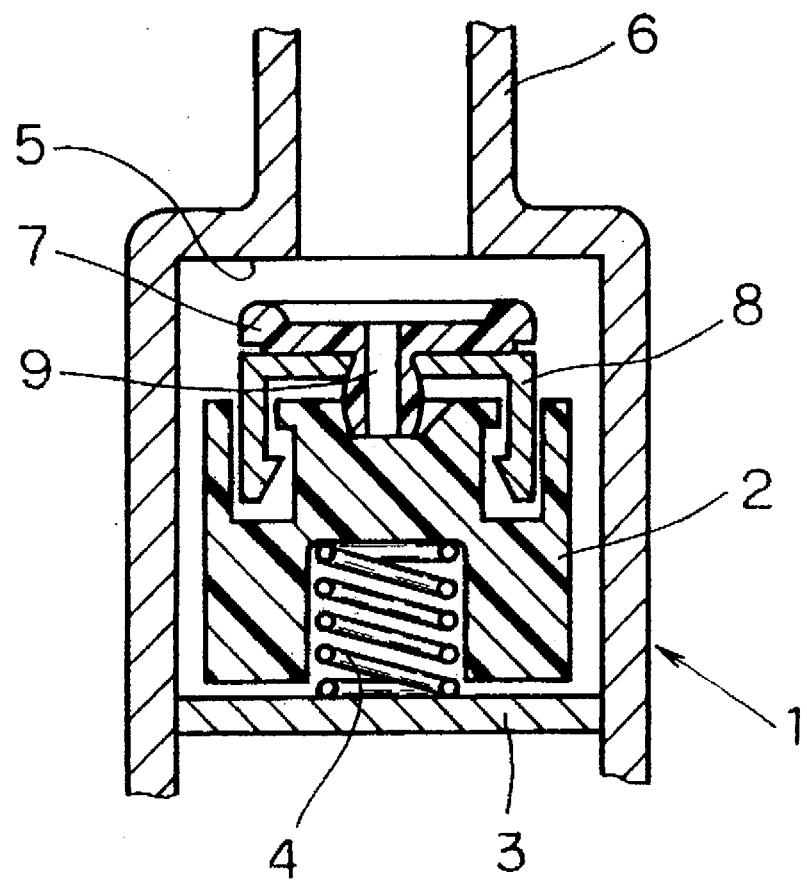
FIG. 12 is a sectional view of a conventional stop valve.
Figure 13:
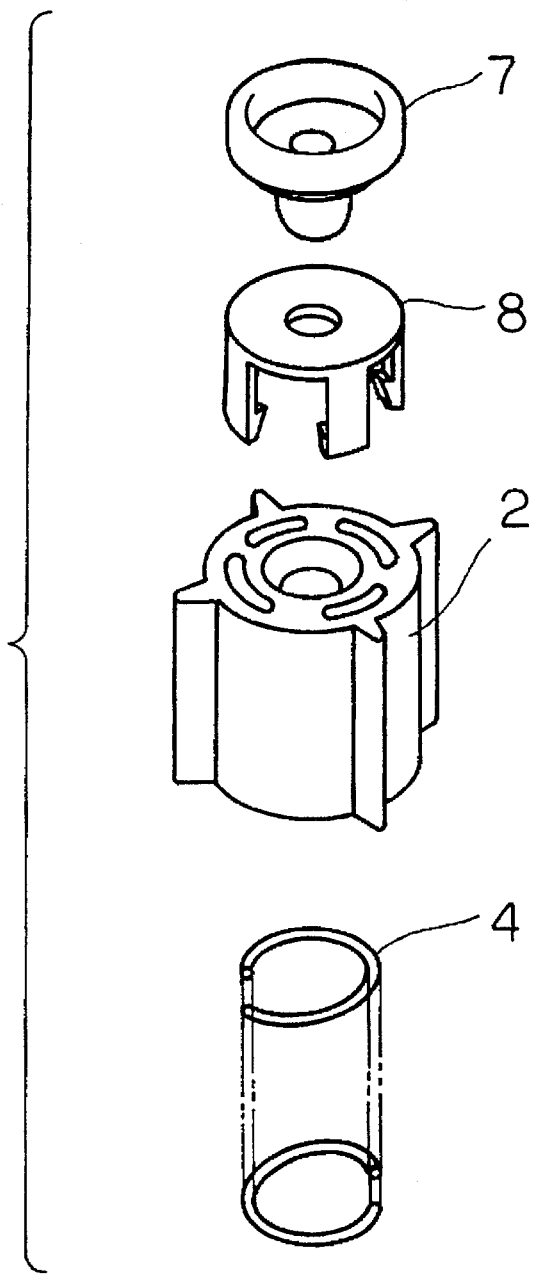
FIG. 13 is an exploded perspective view of a conventional float unit of the stop valve shown in FIG. 12.

FIGS. 10 and 11 illustrate other constructions of the splash guard provided in the bleeding passage 15. The splash guard shown in FIG. 10 is made up of a plurality of guard plates 20A that are spaced from one another by gaps H with respect to a generally vertical direction. FIG. 11 shows a splash guard mesh 20B disposed in the bleeding passage 15.

As described above, according to the present invention, deformation of a central portion of the valve element will be significantly reduced, thus enhancing sealing of the valve opening by the valve element. Further, a reduction of the deformation of the central portion of the valve element accordingly facilitates release of the valve member from the closed position.

Further, because the present invention requires no additional member for substantially preventing deformation of the valve element, production costs and the number of assembly steps or man hours required can be reduced.

In addition, the splash guard substantially eliminates the possibility that liquid fuel may reach the canister via the valve opening and the bleeding passage during, for example, refueling. Accordingly, the length of the bleeding system can be reduced, thereby facilitating designing a fuel tank system.

While the present invention has been described with reference to what are presently considered to be preferred embodiments, it is to be understood that the invention is not limited to the disclosed embodiments. To the contrary, the invention is intended to cover various modifications and equivalent arrangements included within the spirit and scope of the appended claims.

What is claimed is:

1. A stop valve structure comprising:

a casing having a valve opening defined in an upper portion thereof;

a bleeding passage provided downstream of the valve opening;

a float provided inside the casing for generally reciprocating movement within the casing;

a valve element made of an elastically deformable material and provided on top of the float, said valve element being adapted to close the valve opening when lifted together with the float, the valve element including a hole; and an abutment member provided inside the valve opening for, when the valve element is lifted, abutting a portion of the valve element that surrounds the hole.

2. A stop valve structure according to claim 1, wherein a lower end of the abutment member has a recess.

3. A stop valve structure according to claim 2, further comprising means for reducing deformation of the valve element, said means substantially surrounding the abutment member.

4. A stop valve structure according to claim 3, further comprising a fuel splash guard provided inside the bleeding passage.

5. A stop valve structure according to claim 2, further comprising a fuel splash guard provided in the bleeding passage.

6. A stop valve structure according to claim 1, further comprising means for reducing deformation of the valve element, said means substantially surrounding the abutment member.

7. A stop valve structure according to claim 1, further comprising a fuel splash guard provided inside the bleeding passage.

8. A stop valve structure according to claim 7, wherein said fuel splash guard is crescent-shaped and is positioned in a lower half of said bleeding passage.

9. A stop valve structure according to claim 7, wherein said fuel splash guard comprises a plurality of parallel guard plates aligned substantially along an axial axis of said bleeding passage.

10. A stop valve structure according to claim 7, wherein said fuel splash guard comprises a splash guard mesh substantially covering said bleeding passage.

11. A stop valve structure according to claim 6, wherein said means for reducing deformation includes an arcuate member disposed substantially in a plane in which said abutment member contacts said valve element.

12. A stop valve structure according to claim 1, wherein said float includes an integrally formed splash wall.

13. A stop valve structure according to claim 1, further comprising a bottom plate connected to said casing for supporting said float, wherein said float includes a hollow interior having a flexible member contained therein, said flexible member contacting a recess of said hollow interior and accommodation protrusions on said bottom plate.

14. A stop valve structure according to claim 1, further comprising reinforcing ribs formed on an internal surface of the casing.

15. A stop valve structure according to claim 1, if wherein said abutment member comprises a rod member that is connected to and extends downward from the bleeding passage and terminates substantially near said valve opening.

16. A stop valve structure according to claim 1, wherein said abutment member comprises a hollow annular member that is supported by a plurality of arms that extend from the annular member to an inner peripheral surface of said valve opening.

17. A stop valve structure according to claim 16, further comprising at least one arcuate protrusion mounted on said plurality of arms for preventing deformation of said valve element when said valve element engages said abutment member.

18. A stop valve structure according to claim 16, wherein spaces between said plurality of arms define said valve opening.

19. A stop valve structure according to claim 1, wherein the valve opening is defined by a projected periphery that extends into said casing.

20. A stop valve comprising:

a casing having a valve opening;

a floating body reciprocable within said casing, said floating body being adapted to close said valve opening; and means for equalizing a pressure differential produced across said floating body upon closure of said valve opening including an abutment member that extends downward from a bleeding passage provided downstream of said casing and communicates with a through hole formed in said floating body to equalize said pressure differential.

21. A stop valve according to claim 20, wherein said floating body includes a float and a valve member fixedly attached to said float.

22. A stop valve according to claim 20 wherein said abutment member comprises a rod member that is connected to and extends downward from the bleeding passage provided downstream of said casing, said rod member terminating substantially near said valve opening.

23. A stop valve according to claim 20, wherein said abutment member comprises a hollow annular member that is supported by a plurality of arms that extend from the annular member to an inner peripheral surface of said valve opening.

24. A stop valve according to claim 20, wherein the valve opening is defined by a projected periphery that extends into said casing.

* * * * *